United States Patent
Mukherjee et al.

(10) Patent No.: US 6,944,451 B2
(45) Date of Patent: Sep. 13, 2005

(54) ROUTING METHOD FOR A CALL TO A MOBILE TELEPHONE VIA GLOBAL LOCATION REGISTER

(75) Inventors: Arabinda Mukherjee, South Brunswick, NJ (US); Douglas Harold Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 555 days.

(21) Appl. No.: 09/795,631

(22) Filed: Feb. 28, 2001

(65) Prior Publication Data

US 2002/0119775 A1 Aug. 29, 2002

(51) Int. Cl.⁷ .............................. H04Q 7/20; H04M 3/42
(52) U.S. Cl. .................. 455/435; 455/433; 379/211.01
(58) Field of Search ........................... 379/211, 211.01; 455/435, 433

(56) References Cited

U.S. PATENT DOCUMENTS 6,256,498 B1 * 7/2001 Ludwig ...................... 455/433
6,259,782 B1 * 7/2001 Gallant ................... 379/211.01
2002/0119775 A1 * 8/2002 Mukherjee et al. ......... 455/435

* cited by examiner

Primary Examiner—William D. Cumming

(57) ABSTRACT

A global location register having real-time location information about subscribers for contacting the subscribers in real-time even when the subscribers are not co-located with their customer premise equipment being called. In one embodiment, the global location register includes subscriber location information and service scripts for providing subscriber location estimates to be included in the subscriber location information, wherein subscriber location information includes subscriber information for identifying subscribers and current location information for indicating locations at which subscribers are Likely to be reached in real-time. In an embodiment, the current location information may indicate current access networks and/or current destination addresses associated with the current location. The global location register can be used to respond to queries regarding subscribers' current locations or to route calls to subscribers in real-time.

9 Claims, 3 Drawing Sheets

100

ROUTING METHOD FOR A CALL TO A MOBILE TELEPHONE VIA GLOBAL LOCATION REGISTER

FIELD OF THE INVENTION

The present invention relates generally to telecommunication systems and, in particular, to location register routing in telecommunication systems.

BACKGROUND OF THE RELATED ART

A typical telecommunication subscriber often has a plurality of customer premise equipment (CPE) through which the subscriber may be reached. FIG. 3 depicts a typical telecommunication subscriber 50 and possible access networks subscribed to by subscriber 50 (or employer, family, etc.). Subscriber 50 subscribes to or utilizes a plurality of access networks 52, 54, 56, 58 to which a plurality of CPE 60, 62, 64, 66, 68, 70, 72 are connected via a wired or wireless interface. Specifically, telephone 60 and fax machine 62 are connected to a local access network, such as plain old telephone (POT) network 52; mobile-telephone 64 is connected to mobile-telephone communication system 54; telephone 70, personal computer 68 and fax machine 66 are connected to a local access network, such as integrated subscriber digital network (ISDN) 56; and television 72 is connected to cable network 58. Each of the plurality of CPE 60, 62, 64, 66, 68, 70, 72 has its own or shares a destination address, such as a telephone number or e-mail address, for identifying the subscriber. A calling party desiring to reach the subscriber dials or inputs one of the destination addresses associated with the subscriber. However, if the subscriber is not co-located with the CPE associated with the dialed or inputted destination address, then the calling party will not reach the subscriber in real-time. Accordingly, location information regarding the subscriber becomes ever increasingly important if the calling party is to reach the subscriber in real-time, wherein location information indicates a CPE and/or access network at which the subscriber may be reached in real-time.

In wired access networks, such as local access networks and long distance networks, location information is not available in any form. Thus, if the subscriber is not co-located with the subscriber's wired access network CPE, then the subscriber cannot be reached in real-time at that CPE through the associated wired access network. For example, if the calling party calls the subscriber's home telephone when the subscriber is either at work or on the road, the calling party will not be able to reach the subscriber in real-time.

In wireless access networks, location information is available for mobile-telephone communication systems in the form of a home location register (HLR). The HLR includes location information that indicates which mobile-telephone communication system, if any, is currently serving an associated CPE of a subscriber. That is, if the subscriber's CPE is a mobile-telephone, the HLR of the mobile-telephone communication system subscribed to by the subscriber, i.e., home system, will indicate the mobile-telephone communication system currently serving the subscriber's mobile-telephone even if the mobile-telephone is being served by another mobile-telephone communication system other than the one subscribed to by the subscriber (i.e., roaming system). Such location information in the HLR is used by the home system to reach the subscriber at the associated mobile-telephone and complete the call. However, if the subscriber's mobile-telephone is not currently being served by any mobile-telephone communication system, such as when the subscriber's mobile-telephone is powered off, the calling party will not be able to reach the subscriber in real-time at the subscriber's mobile-telephone through the home system. In effect, when the subscriber is not using any mobile-telephone communication system, the subscriber is essentially not co-located with the mobile-telephone since the subscriber cannot be reached in real-time through the home system. Accordingly, there exists a need for locating subscribers in real-time when the subscriber is not co-located with the CPE being called.

SUMMARY OF THE INVENTION

The present invention is a global location register having real-time location information about subscribers for contacting the subscribers in real-time even when the subscribers are not co-located with their customer premise equipment being called. In one embodiment, the global location register includes subscriber location information and service scripts for providing subscriber location estimates to be included in the subscriber location information, wherein subscriber location information includes subscriber information for identifying subscribers and current location information for indicating locations at which subscribers are likely to be reached in real-time. In an embodiment, the current location information may indicate current access networks and/or current destination addresses associated with the current location. The global location register can be used to respond to queries regarding subscribers' current locations or to route calls to subscribers in real-time.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
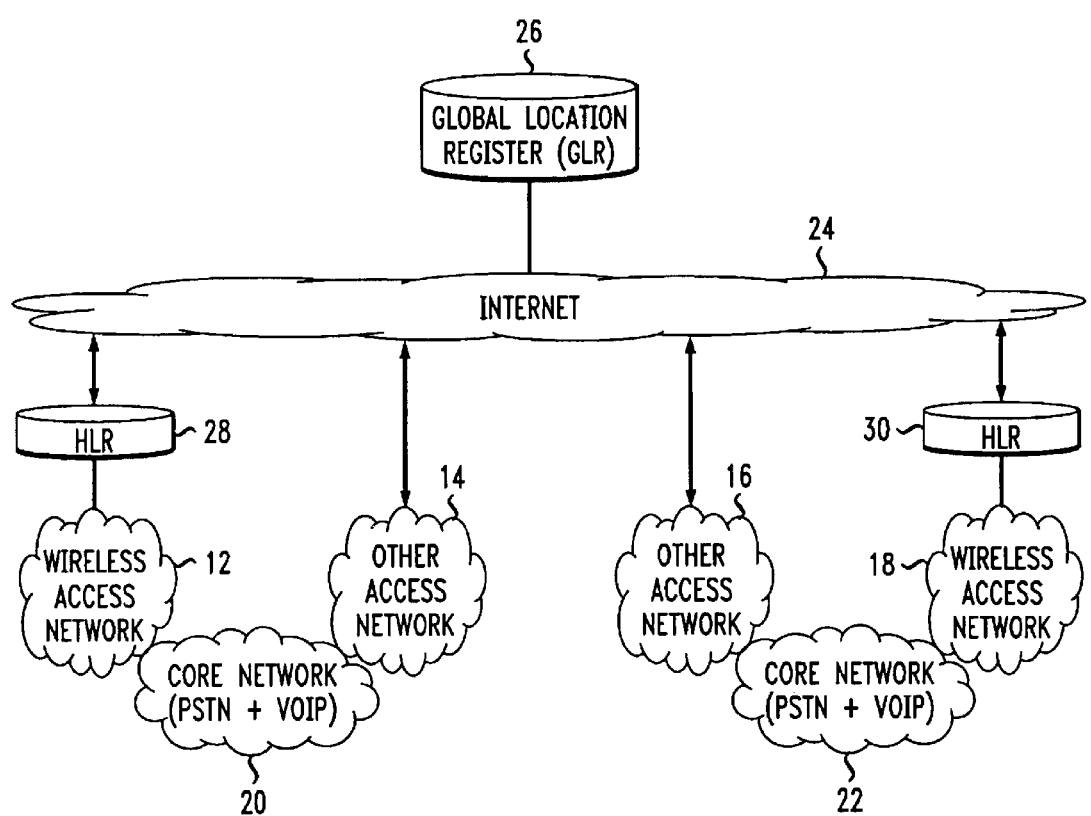
FIG. 1 depicts an example of a telecommunication architecture in which the global location register of the present invention may incorporated.

The present invention is a global location register having real-time location information about called parties for contacting the called parties in real-time even when the called parties are not co-located with the customer premise equipment being called. FIG. 1 depicts an example of a telecommunication architecture 10 in which the global location register of the present invention may incorporated. Telecommunication architecture 10 includes access networks 12, 14, 16, 18, core networks 20, 22, internet 24 and global location register (GLR) 26. Access networks 12, 14, 16, 18 being connected to core networks 20, 22 and to internet 24. GLR 26 being connected to internet 24.

Access networks 12, 14, 16, 18 includes wireless access networks 12, 18 and wired access networks 14, 16. Examples of wireless access networks 12, 18 include wireless or mobile-telephone communication systems, paging systems, text messaging systems, etc. Examples of wired access networks include plain old telephone (POT) systems, integrated subscriber digital networks (ISDN), cable networks, Ti networks, PBX, digital subscriber loops (DSL), asymmetrical digital subscriber loops (ADSL), etc. Each wireless access networks 12, 18 may include a home location register (HLR) 28, 30 having location and other information about subscribers of wireless access networks 12, 18 to which it belongs. Specifically, HLR 28, 30 include information regarding subscriber's location (i.e., current wireless access systems serving subscriber), subscriber's profile and equipment, features to which subscriber has subscribed, whether subscriber has an active call, etc.

Subscribers of access networks 12, 14, 16, 18 are connected to their access networks through customer premise equipment (CPE), not shown. In wireless access networks, the CPE may be a mobile-telephone, a pager, a personal digital assistant, etc. In wired access networks, the CPE may be a POT phone, an ISDN phone, a personal computer, a television set, a fax machine, etc.

Core networks 20, 22 include public switched telephone networks (PSTN), VOIP and any private or public global packet network. Internet 24 include private and public internets and other means of allowing access networks 12, 14, 16, 18 to connect to or access GLR 26, such as a modem, a dedicated connection, etc.

GLR 26 is an entity or device having subscriber location information and subscriber characteristics information. Subscriber location information includes information on how to reach (or the most likely manner of reaching) a subscriber in real-time, whereas subscriber characteristics information includes relevant information personal to the subscriber.

Preferably, GLR 26 is accessible by one or more access networks 12, 14, 16, 18 and/or other entities, not shown, in the sense that the subscriber location information and/or subscriber characteristics information can be retrieved and/or modified directly or indirectly by access networks 12, 14, 16, 18 and/or other entities; GLR 26 is not a part of any access network; and GLR 26 includes information about subscribers of multiple access networks and of different types of access networks (for example, subscribers of wireless access networks, wired access networks or both). Preferably, GLR 26 can only be accessed by access networks or other entities that subscribe to GLR 26, by access networks or other entities having subscribers that subscribe to GLR 26 (on a subscriber basis), etc.

In one embodiment, the subscriber location information includes information about subscribers and current location. Subscriber information includes subscriber identities for identifying subscribers. Current location information includes current access network identities and/or, if necessary, current destination addresses. Current access network identities indicate the current access networks at which the subscribers may be reached in real-time. Current destination addresses, such as telephone numbers and e-mail addresses, indicate addresses associated with the subscribers for the access networks.

Note that, in some cases, current destination addresses may also indicate the current access network or be sufficient by itself for routing purposes. A current example is number portability and number pooling. These number services allow for NANP directory numbers to point only to PSTNs, not to local service provider's networks.

In one embodiment, the subscriber characteristics information includes information about subscribers, subscribed-to access networks, customer premise equipment, services, protocols, security, message depots and miscellaneous. Subscriber information includes subscriber identities for identifying subscribers. Subscribed-to access network information includes subscribed-to access network identities and subscribed-to destination addresses. Subscribed-to access network identities indicate the access networks to which the subscribers have subscribed. Subscribed-to destination addresses indicate addresses associated with the subscribers for the subscribed-to access networks, i.e., destination addresses of CPE connected to access networks.

CPE information indicates the CPE associated with the subscribed-to access networks and destination addresses for the subscribers. A default CPE may also be indicated For example, CPE information might indicate that a subscriber has a POT phone, a fax machine and an answering machine connected to a subscribed-to wired access network, wherein the POT phone is the default CPE. CPE information may also include other information about the CPE, such as the make and model of the POT phone, fax machine, answering machine, etc. for purposes of identifying what types of services the CPE are capable of receiving or utilizing.

Service information includes subscriber service characteristics for specifying the types of service to which the subscribers have subscribed for the associated subscribed-to access networks and destination addresses. Types of services may include voice, data, multimedia, text messaging, voice mail, internet access, call forwarding, caller ID, call waiting, conferencing, etc.

Protocol information includes information about the protocols utilized by the subscribed-to access networks of the subscribers such that the proper protocols are used to communicate with the subscribers through their subscribed-to access networks. For example, protocol information might indicate that an access network of a subscriber is utilizing a protocol defined by ANSI SS7 or a private data protocol. Or that the access network is a direct internet connection. Protocol information may also include information about the protocols utilized by the CPE at the subscribed-to destination addresses, which may place limitations on the ability of the subscriber to receiver certain types of messages. For example, a voice-only phone cannot receive a fax transmission.

Security information includes encryption information and privacy protection information. Encryption information indicates encryption schemes used by the subscribers or access networks, whereas privacy protection information indicates security codes associated with the subscribers. Message depot information indicates where audio, text or video messages may be left for the subscribers in the event the subscribers cannot be reached using the subscriber location information.

Miscellaneous information include private information and non-private information. Private information include information on the subscriber's medical history, bank accounts, restrictions on incoming calls, subscriber location information, special handling instructions for certain callers (such as call forwarding or recorded announcements), etc. Non-private information include information on the subscriber's driver license, home address, work address, non-private recorded announcements, subscriber's functional status or capabilities, etc. Security codes may be associated with the miscellaneous information for controlling whom may access the private and non-private information, wherein the security codes are part of the privacy protection information.

The data in the subscriber location information is inputted or updated via a process referred to herein as "registering." Registering may be achieved via service scripts or real-time updating. Service scripts are programs or algorithms for generating and/or updating subscriber location information and directing how subscriber services are to be executed depending on factors such as time of day, day of the week, location, subscriber's functional state or performance limitations, etc.

In one embodiment, the service scripts estimate the locations of the subscribers. Such estimates are then used to generate and/or update the subscriber location information and to direct how subscriber services are to be executed. The estimates might be based on predictions of the subscriber's location using subscriber usage patterns, or based on predetermined schedules (which may have been provided or set by the subscribers). For example, a service script might cause the current access network identity for a typical subscriber to identify a wireless communication system between the hours of 8:00 am to 9:00 am and 5:00 pm to 6:00 pm for Monday through Friday when the subscriber is traveling between work and home; an ISDN network associated with the subscriber's place of employment between the hours of 9:00 am and 5:00 pm for Monday through Friday when the subscriber is at work; a POT network and a cable network associated with the subscriber's home all other times.

Based on the current access network identified in the subscriber location information, the types of services subscribed to by the subscriber, the types of CPE connected to the current access network, etc., may be determined using the subscriber characteristic information in order to direct how subscriber services may be executed. For example, suppose a caller wants to email the subscriber such that the subscriber receives the email in real-time. If the current access network identified in the subscriber location information indicates that the current access network of the subscriber is associated with a fax machine, the service script may cause the email to be routed to the fax machine instead of, or in conjunction with, the subscriber's email account. Alternately, the email is just sent to the subscriber's email account and the service script may alert the subscriber by pager, for example, that an email has just been received, or the email may be routed to a mobile-telephone of the subscriber.

The service scripts may be over-written via real-time updating. Real-time updating is initiated by subscriber action. In one embodiment, a subscriber can directly or indirectly cause a registration message to be sent to GLR 26 indicating the subscriber's current location, wherein GLR 26 uses the registration message to update the subscriber location information. Specifically, the subscriber may directly send a registration message to GLR 26 using a questionnaire or form on a website, a call center, a touch-tone phone (in response to a series of questions), etc. which, in turn, is used to update the subscriber location information.

The subscriber may indirectly cause a registration message to be sent to GLR 26 by utilizing one of the subscribed-to access networks associated with the subscriber (or a non-subscribed-to access network). For example, if the subscriber powers on the mobile-telephone when the subscriber location information indicates the access network associated with the subscriber's place of employment as the current access network, the ULR of the wireless or mobile-telephone communication system to which the subscriber subscribes transmits a registration message to GLR 26 with real-time location information about the subscriber, i.e., subscriber is currently being served by the wireless or mobile-telephone communication system sending the registration message or by another wireless or mobile-telephone communication system in which the subscriber is roaming, which would cause the current access network identity to identify the wireless or mobile-telephone communication system as the current access network. In another example, logging on at the internet service provider (ISP) of the subscriber may cause the ISP to transmit a registration message to GLR 26 indicating that the subscriber can be currently located through the ISP.

Figure 2:
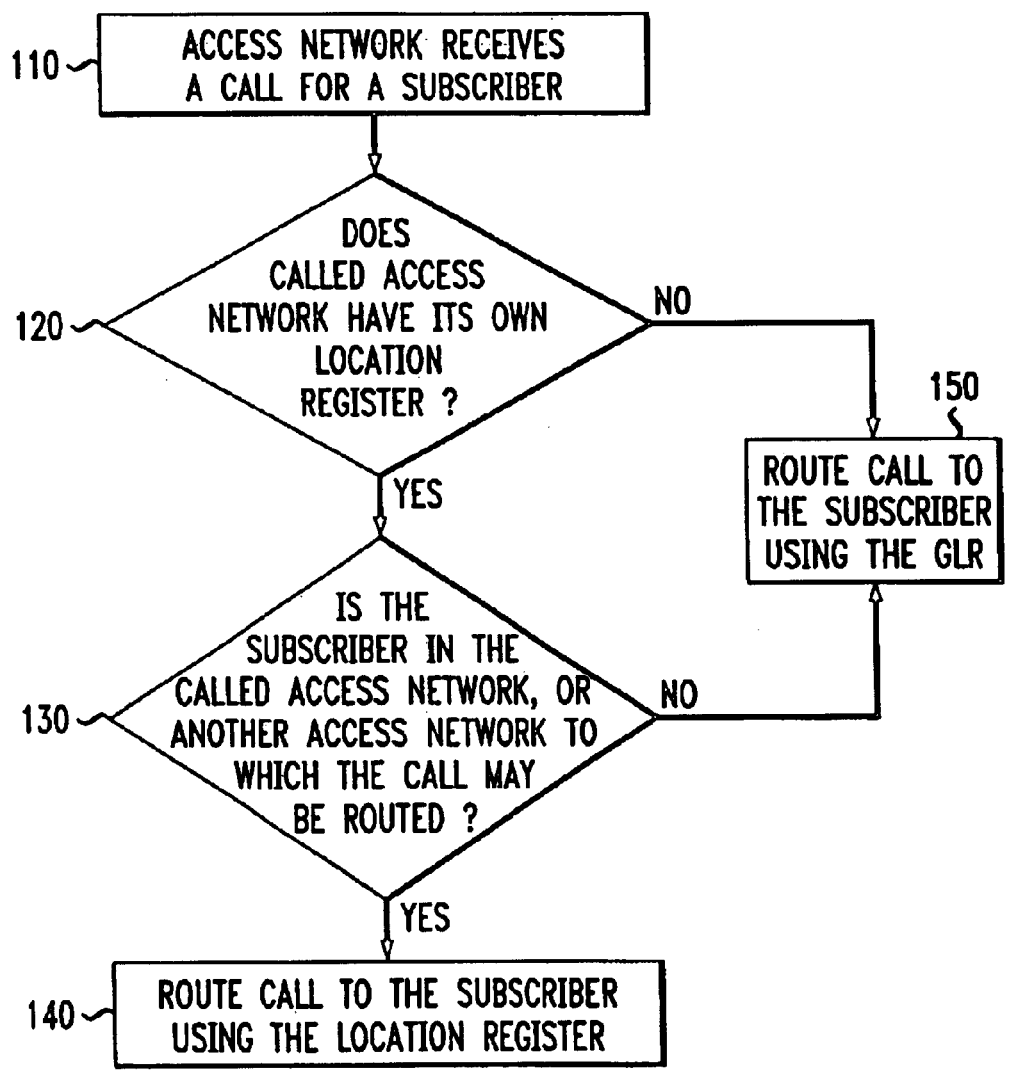
FIG. 2 depicts a flowchart illustrating a process of using the global location register of the present invention for completing a call.
Figure 3:
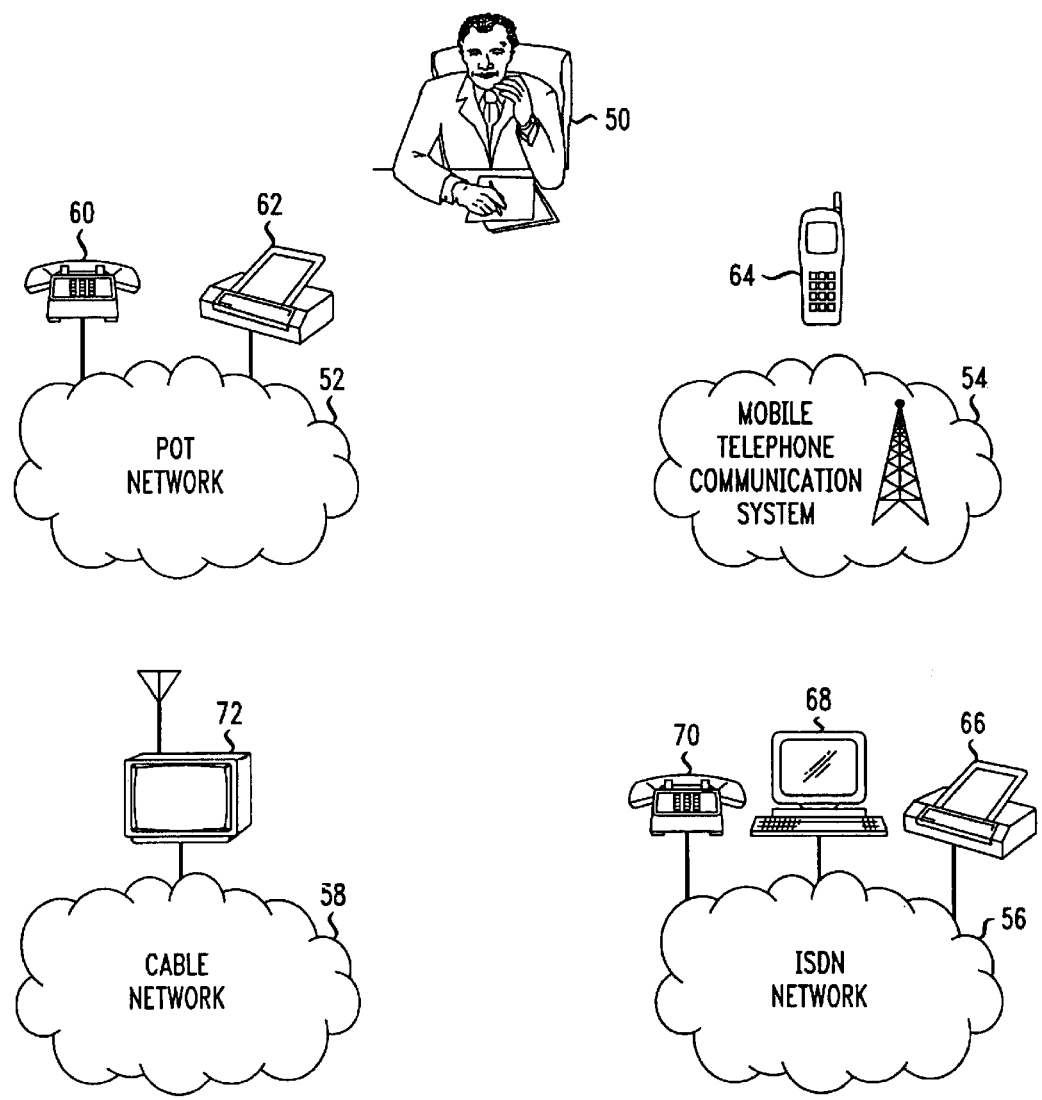
FIG. 3 depicts a typical telecommunication subscriber and possible access networks subscribed to by subscriber.

In one embodiment, GLR 26 includes a transmitter, a receiver, a processor (CPU, ASIC, DSP, etc.) and router such that GLR 26 is operable to route calls or respond to queries as to the location of subscribers using the subscriber location information and, perhaps, the subscriber characteristics information. FIG. 2 depicts a flowchart 100 illustrating a process of using GLR 26 for completing a call. In step 110, a calling party calls a subscriber at an access network subscribed to by the subscriber. In step 120, if the called access network has its own home (or other) location register, the process continues to step 130. In step 130, the called access network attempts to determine the subscriber's current location using its home location register. In step 140, if the subscriber's current location can be determined from the home location register, the called access network causes the call to be completed. For example, if the home location register indicates that the subscriber is currently being served by the called access network, the called access network routes the call to the subscriber. If the home location register indicates that the subscriber is currently being served by another access network, the called access network routes the call to the access network currently serving the subscriber, as indicated by the home location register, so that the call may be completed.

If the called access network does not have its own home location register or if the subscriber's current location cannot be determined from the called access network's home location register, the process continues from respective steps 120 or 130 to step 150. In step 150, the call is routed or completed using GLR 26. In one embodiment, the access network queries GLR 26 for the location of the subscriber by sending a query message having subscriber information indicating the subscriber. GLR 26 uses the subscriber information to determine the current location information for the associated subscriber (via the subscriber location information). If necessary, the subscriber and current location information are used to retrieve other subscriber related information from the subscriber characteristics information. For example, if the subscriber is currently located within access network A, then the subscriber characteristics information for access network A, such as the CPE and protocol information, can be retrieved. GLR 26 returns a response having the subscriber's current location information and other retrieved subscriber characteristics information (along with associated subscriber information), and the called access network routes the call to the subscriber using the received response. In another embodiment, the called access network routes the call (with an indication of the subscriber to whom the call is intended) to GLR 26 which, in turn, routes the call to the subscriber at the current access network identified in the current location information.

Although the present invention has been described in considerable detail with reference to certain embodiments, other versions are possible. Therefore, the spirit and scope of the present invention should not be limited to the description of the embodiments contained herein.

We claim:

1. A method of routing a call to a mobile-telephone comprising the steps of:

receiving a call for a subscriber at a first access network subscribed-to by the subscriber;

routing the call to a global location register with an indication of the subscriber to whom the call is intended; and routing the call from the global location register to a second access network subscribed-to by the subscriber.

2. The method of claim 1 comprising the additional step of:

before the step of routing the call to the second access network completing the call using a home location register belonging to the first access network if the home location register indicates a current location of the called subscriber.

3. The method of claim 1, wherein the step of routing the call from the global location register to a second access network comprises the step of transmitting a query message having subscriber information indicating the subscriber to the global location register.

4. The method of claim 3, wherein the step of routing the call from the global location register to a second access network comprises the step of:

receiving a response to the query message indicating a current access network associated with the subscriber; and completing the call using the current access network indicated in the response.

5. The method of claim 1, wherein the step of routing the call from the global location register to a second access network occurs if the subscriber is estimated to be reached in real-time through the second access network.

6. The method of claim 1, wherein the global location register comprises:

subscriber location information indicating a manner of locating subscribers in real-time.

7. The method of claim 6, wherein the subscriber location information includes subscriber identities for identifying the subscribers and current location information for indicating a manner of routing calls to the subscribers in real-time.

8. The method of claim 1, wherein the global location register further comprises:

subscriber characteristics information indicating relevant information personal to the subscribers.

9. The method of claim 8, wherein the subscriber characteristics information includes at least one of subscriber information, subscribed-to access networks information, customer premise equipment information, service information, protocol information, security information, message depot information, private information and non-private information.

* * * * *